G. H. GIBSON.
ENGINE GOVERNING MECHANISM.
APPLICATION FILED SEPT. 27, 1913.
1,197,283.
Patented Sept. 5, 1916.
3 SHEETS—SHEET 3.
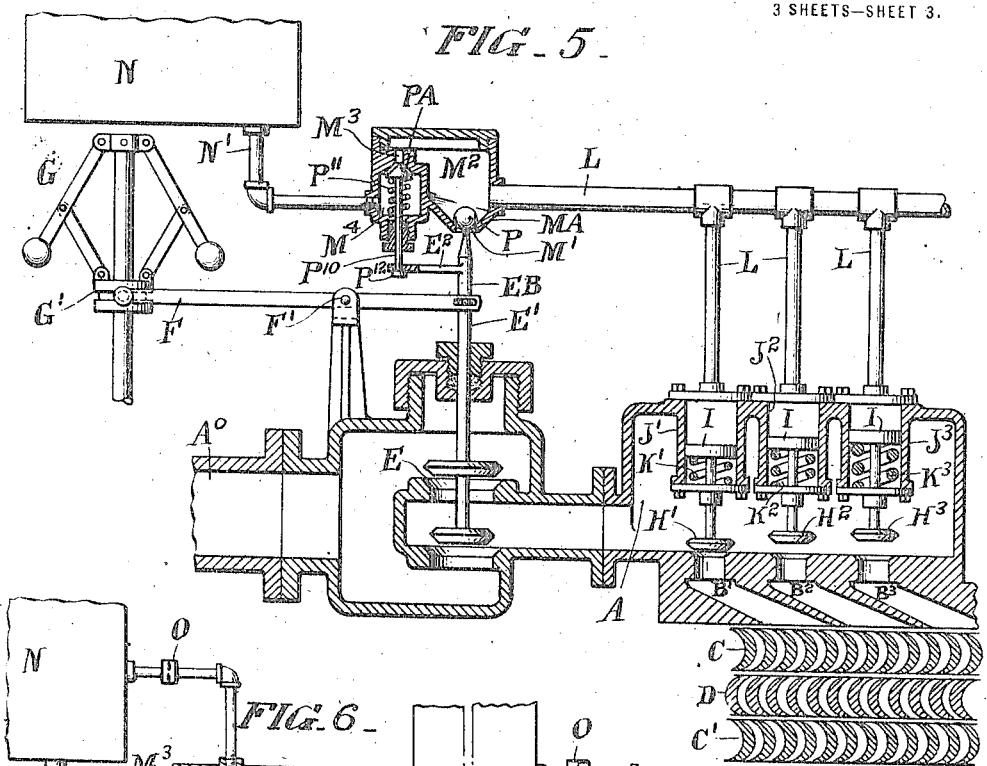
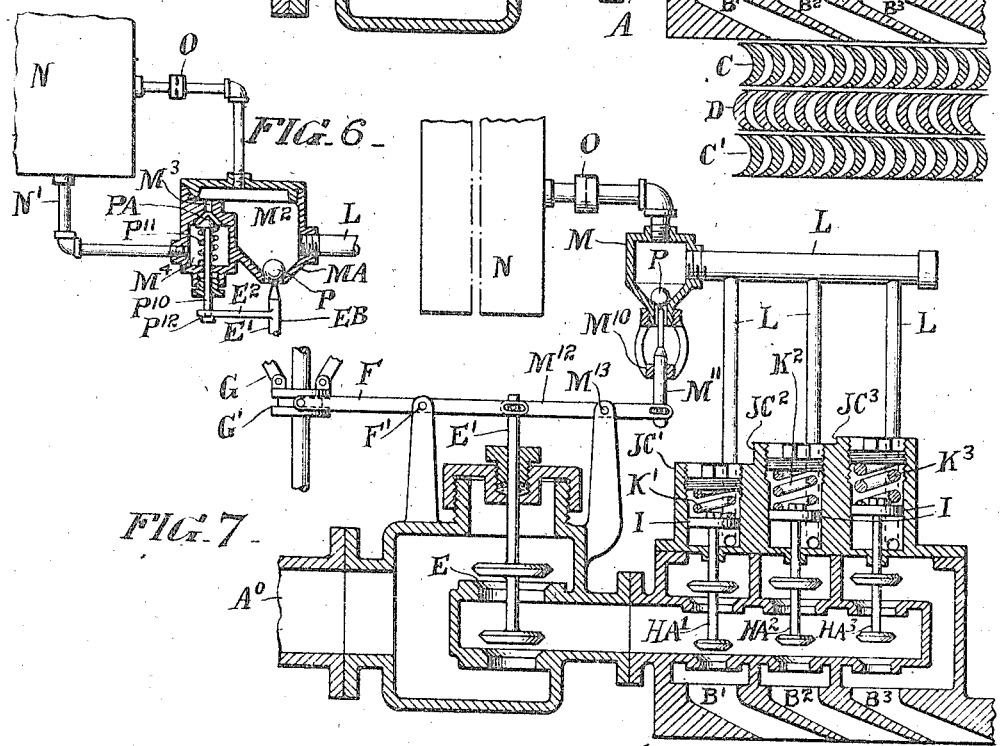
WITNESSES
INVENTOR
George H. Gibson
BY
ATTORNEY

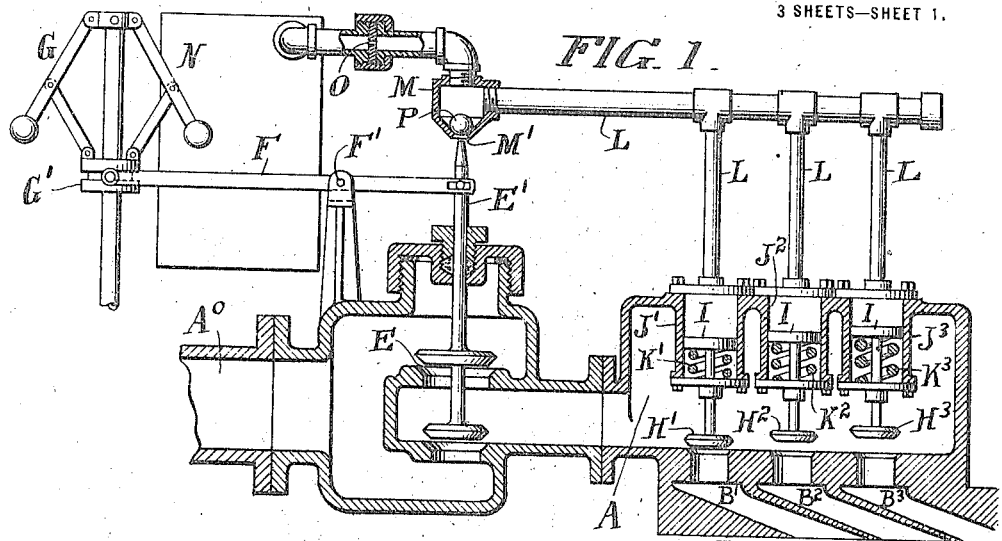
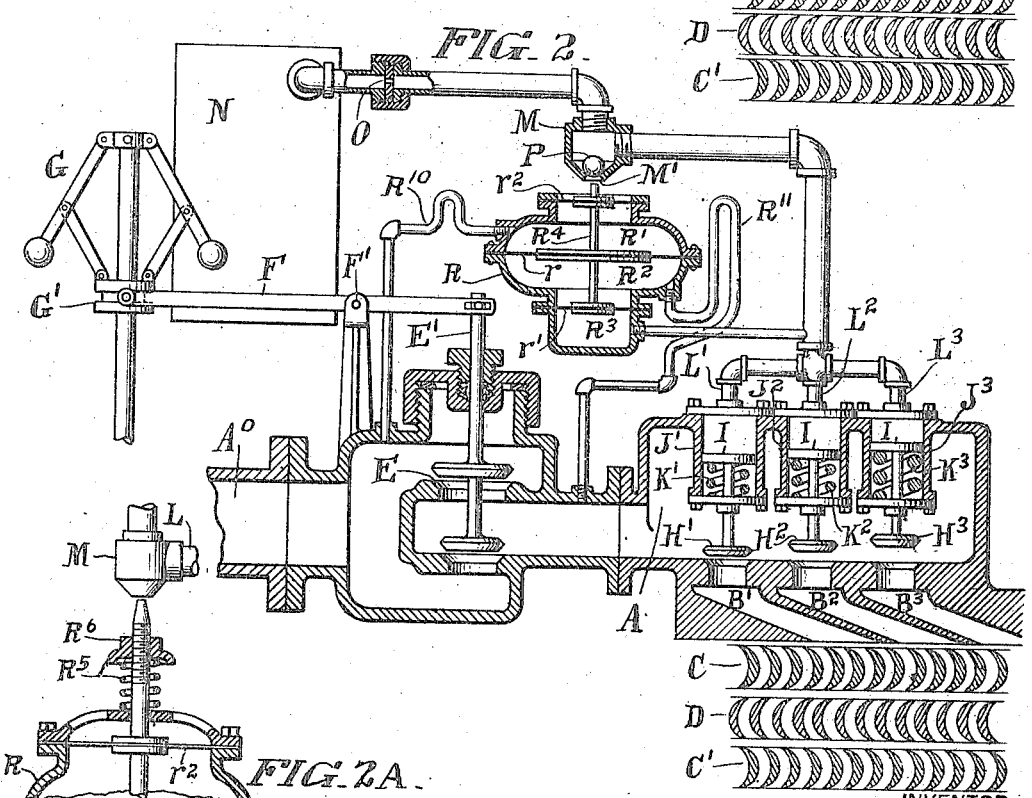

UNITED STATES PATENT OFFICE.

GEORGE H. GIBSON, OF MONTCLAIR, NEW JERSEY, ASSIGNOR TO DE LAVAL STEAM TURBINE COMPANY, OF TRENTON, NEW JERSEY, A CORPORATION OF NEW JERSEY.

ENGINE-GOVERNING MECHANISM.

1,197,283.   Specification of Letters Patent.   Patented Sept. 5, 1916.

Application filed September 27, 1913. Serial No. 792,084.

*To all whom it may concern:*

Be it known that I, GEORGE H. GIBSON, a citizen of the United States of America, residing in Montclair, in the county of Essex and State of New Jersey, have invented a certain new and useful Improvement in Engine-Governing Mechanism, of which the following is a true and exact description, reference being had to the accompanying drawings, which form a part thereof.

My present invention consists in improved governing mechanism, which is well adapted for use in controlling the supply of the motive fluid to various types of fluid pressure motors such as steam turbines, and water wheels, and is especially adapted for controlling the supply of motive fluid to certain types of steam turbines now in general use.

The object of the invention is to provide simple and effective mechanism for the purpose specified adapted to afford a very definite and effective regulation of the speed of the motor to which the mechanism may be applied and capable of insuring, in certain forms, practically absolute uniformity in speed under all loads, and in other forms of giving predetermined and definite speed variations as the load varies.

The various features of novelty which characterize my invention are pointed out with particularity in the claims annexed to and forming a part of this specification. For a better understanding of the invention, however, and of the advantages possessed by it reference should be had to the accompanying drawings and descriptive matter in which I have illustrated and described forms in which the invention may be embodied.

Figure 3:
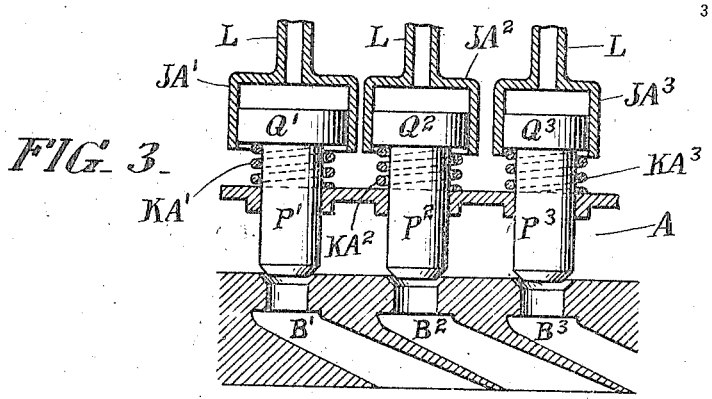
Figure 4:
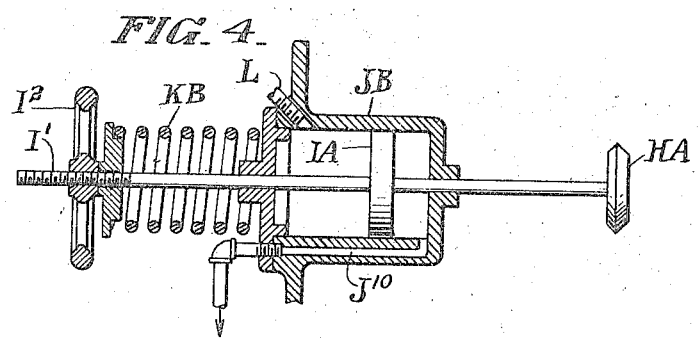

Of the drawings: Figure 1 is a diagrammatic elevation partly in section illustrating the use of one form of my invention as applied to a steam turbine; Fig. 2 is a view taken similarly to Fig. 1, illustrating the use of a second form of my invention as applied to a steam turbine; Fig. 2^A is a view taken similarly to Fig. 2, showing a modification of a portion of the apparatus of Fig. 2; Fig. 3 is a partial sectional elevation of a modification of a portion of the valve mechanism employed alike in Figs. 1 and 2; Fig. 4 is a partial sectional elevation of another modified form of a valve mechanism which may be employed in such an arrangement as is shown in Figs. 1 and 2; Fig. 5 is a view taken similarly to Fig. 1, showing another form of my invention, as applied to steam turbines; Fig. 6 is a sectional elevation illustrating a modification of a portion of the apparatus shown in Fig. 5; and Fig. 7 is a view taken similarly to Fig. 1 showing still another form of modification.

In the drawings, Fig. 1 is a somewhat conventional illustration of a portion of a multi-stage steam turbine of well known type in which A represents the steam chest, and $B'$, $B^2$ and $B^3$ the nozzles leading therefrom to the first set of moving blades of vanes C, stationary blades or vanes D being interposed between the first set of moving blades C and a second set of moving blades $C'$. The passage of steam to the steam chest A from the supply pipe $A^o$ is controlled in the usual manner by a balanced throttle valve E, which, as shown, has its stem $E'$ connected to a lever F. The lever F is fulcrumed at $F'$, and is connected at its opposite end to the sliding sleeve $G'$ of a centrifugal governor rotating at a velocity proportional to the velocity of rotation of the turbine shaft (not shown) which carries the movable vanes C and $C'$. The admission of steam to each of the nozzles $B'$, $B^2$ and $B^3$ from the steam chest A is separately controlled by a corresponding nozzle valve $H'$, $H^2$ and $H^3$.

In so far as above described, the turbine and controlling mechanism shown in Fig. 1 do not differ from well known types of apparatus in general use. The means about to be described for controlling the operation of the nozzle valves $H'$, $H^2$ and $H^3$, comprise features novel with me, however. As shown, each of the nozzle valves has its stem connected to a piston I, working in a corresponding cylinder $J'$, $J^2$ and $J^3$. Springs $K'$, $K^2$ and $K^3$ interposed between the inner ends of the cylinders $J'$, $J^2$ and $J^3$ and the pistons I working therein tend to hold the valves $H'$, $H^2$ and $H^3$ open. The outer ends of the cylinders $J'$, $J^2$ and $J^3$ are each connected to a common variable pressure system L which as shown comprises connected piping and a valve casing M. The system L is connected to a source of pressure fluid such as the compressed air supply tank N through a restricted orifice O. The valve casing M is provided with an outlet port $M'$ which is controlled by the ball valve P, The ball valve P tends, at all times, to move into, or remain in a position in which it closes the outlet port M′, but is lifted off its seat from time to time as hereinafter explained by the upper end of the throttle valve stem E′.

With the apparatus described, it will be apparent that so long as the pressure within the variable pressure system L is below the pressure in the compressed air supply tank N, there will be a constant flow into the variable pressure system tending to bring the pressure in the latter to an equality with the pressure in the tank N. On the other hand, whenever the valve P is lifted off its seat, the subsequent escape of the pressure fluid from the variable system L tends to reduce the pressure in the latter to an equality with that of the atmosphere. The pressure within the system L may thus be varied from atmospheric pressure up to the pressure in the tank N. Furthermore, it will be apparent that if the pressure in the tank N is somewhat above the maximum which is to be maintained in the system L, the pressure in the system L will be dependent solely upon the leakage out of the system, and will be independent of the actual pressure in the tank N.

The pressure in the system L acting against the outer ends of the pistons I tends to move the latter into the positions in which the corresponding nozzle valves H′, H² and H³ seat. In the use of my invention the nozzle valves H′, H² and H³ are intended to close progressively and successively as the pressure in the system L rises, opening in the reverse order as the pressure falls. This result is obtained with the mechanism shown in Fig. 1 in which the pistons I are all of the same size, by making the spring K³ stronger than the spring K², and the spring K² stronger than the spring K′. With the particular mechanism shown in Fig. 1 in which the pistons I are engaged by the graduated springs K′, K² and K³, the position of each piston, prior to the closure of the valve connected to it, will depend upon the pressure in the system L, but the parts may be, and preferably are, so proportioned that the valve H² will not come close enough to its seat to have an appreciable throttling effect until after the valve H′ is seated, while similarly the valve H³ will exert no throttling effect until the valve H² is seated.

In the operation of the apparatus shown in Fig. 1, a slight increase in the engine speed will result in a corresponding depression by the governor of the valve stem E′, which will permit the valve P to seat, or approach more closely to its seat. This in turn will result in raising the pressure in the system L. Assuming an initial position of the nozzle valves such as is shown in Fig. 1, a rise in the pressure to which the outer ends of the pistons I are subjected, will result first in a gradual closing movement of the nozzle valve H′, and then, if the pressure in the system L continues to rise, in the throttling followed by the entire closure of the port controlled by the valve H², and finally in the throttling and subsequent closure of the port controlled by the valve H³. Upon a diminution in the speed of the turbine below that which it is desired to maintain, the valve P will be opened by the governor controlled valve stem E′ so that the consequent reduction in the pressure in the variable system L will bring about a corresponding graduated opening movement of the various nozzle valves which will continue until the nozzle valves are all wide open unless arrested by the return of the turbine speed to its normal value.

Preferably the apparatus shown in Fig. 1 should be so designed and proportioned, that the valve P is normally "cracked," with some leakage continuously taking place through the port M′. When the load is steady, this leakage will obviously be just equal to the inflow through the restricted port O so that the pressure in the variable pressure system L will remain constant and just sufficient to hold the nozzle valves H′, H² and H³ in the position in which the proper amount of steam is supplied to the turbine to enable the latter to carry its load at the desired speed. Preferably, also, the capacity of the variable pressure system should be large enough with reference to the flow through the ports O and M′ when the valve P is moved slightly from its normal position that the pressure in the variable pressure system will not instantly become that corresponding to the adjusted position of the valve but will slowly rise or fall to the last mentioned pressure, which thus depends not only on the particular position of the valve P but also, to some extent, on the duration of the time in which it has occupied such position. The movement of the valve P required to increase or diminish the pressure in the system L, and thereby decrease or increase the amount of steam supplied to the turbine blades is very slight, and in practice the parts may be proportioned to make the speed variation of the turbine practically negligible under ordinary operating conditions. It is apparent, furthermore, that the system of control shown by Fig. 1, gives the maximum turbine efficiency possible with the type of turbine illustrated in so far as its efficiency is effected by the throttling by the governing mechanism of the steam passing to the turbine.

In the normal operation of the apparatus described above, the balanced throttle valve E serves no function whatever, except as a safety device to limit the speed of the engine in case of failure of the operating means for the nozzle valves H', H² and H³, such as might occur for instance on an accidental reduction of the pressure in the tank N. The valve E may, therefore, be entirely dispensed with, or may be operated by some other automatic emergency mechanism not dependent, for instance, upon the speed governor employed to control the valve P.

It will be apparent that the progressively graduated movements of the nozzle valves in response to variations in the pressure of the variable pressure system L may be brought about by other forms of mechanism than that shown in Fig. 1, and in Fig. 3, I have shown one modification in which the valves H', H² and H³ are replaced by valves formed by the ends of plungers P', P² and P³, projecting into the steam chest A through the outer wall thereof, and carrying at their outer ends corresponding pistons Q', Q² and Q³, working in cylinders JA', JA² and JA³ respectively. The outer ends of these cylinders are connected to the system L, as are the cylinders J', J² and J³ of Fig. 1. In the form shown in Fig. 3, the pistons Q', Q² and Q³, and the piston chambers in which they work, are of progressively decreasing diameters, and the springs KA', KA² and KA³ are of equal strength. It will be apparent without further explanation that the valves P', P² and P³ will respond to variable pressures in the system L just as do the valves H', H² and H³ of Fig. 1.

In the modification shown in Fig. 4, the nozzle valve HA shown may be substantially identical in construction with the valves H', H² and H³, but the piston LA connected to each valve is provided with a stem I' which passes through the outer end of the cylinder JB in which the piston IA works, and externally thereof, is threaded to receive a hand-wheel I² by which the tension of the corresponding spring KB tending to hold the valve open may be adjusted as desired. A vent J¹⁰ opening into cylinder JB permits air leaking past the piston IA or steam leaking out of the steam chest along the valve stem to escape to the atmosphere.

Fig. 2 represents a modified type of my controlling apparatus in which provisions are made for varying the speed of the turbine in a predetermined manner as the load on the turbine varies. As shown in Fig. 2, the nozzle valves and fluid pressure operating means therefor are identical with the corresponding parts of the apparatus shown in Fig. 1, but in Fig. 2, the outlet valve P working in the casing M is not directly responsive to the position of the speed governor, but is responsive to the difference between the pressures in the steam chest A and in the steam supply pipe A°, i. e., is responsive to the pressure differential due to the throttling action of the governor controlled valve E. The means employed to obtain this result comprise a differential pressure balancing mechanism consisting of a casing R divided into two pressure chambers R' and R² by a central diaphragm r, and formed also with a chamber R³, separated from the chamber R² by a diaphragm r'. A third diaphragm r², preferably of the same diameter as the diameter r', and like it, parallel to and coaxial with the larger diaphragm r, closes an opening formed in the wall of the chamber R'. The three diaphragms r, r' and r² are connected together at their centers by a stem R⁴, which has its upper end extended into position to act on the valve P in the same manner as does the upper end of the valve stem E' in the construction shown in Fig. 1. The chambers R' and R² are connected by conduits R¹⁰ and R¹¹ to the inlet and outlet compartments respectively, of the casing, of the valve E. The pressures in these compartments correspond, of course, to the pressures in the steam supply pipe A° and steam chest A respectively. The chamber R³ is directly connected to the variable pressure system L. With this arrangement it will be apparent that the pressure in the steam pipe A° acting upwardly against the diaphragm r² and downwardly against the larger diaphragm r, tends to depress the valve stem R⁴, while the pressure of the steam chest A acting upwardly against the diaphragm r and downwardly against the smaller diaphragm r' tends to raise the stem R⁴. The lifting action on the stem R⁴ of the pressure in the chamber R² is supplemented by the action of the pressure in the system L against the underside of the diaphragm r'. In practice I prefer to have the pipes R¹⁰ and R¹¹ so arranged that the chambers R' and R² will fill with water of condensation, and if the stem R⁴ is arranged vertically as shown, there may be an appreciable downward thrust on the stem R⁴ due to gravity. This may be compensated, or the operation of the apparatus otherwise modified by the spring R⁵ acting as shown in Fig. 2ᴬ between the casing R and a tension adjusting nut R⁶ screwed on a threaded portion of the stem R⁴. With this arrangement shown in Fig. 2, it will be apparent that as the difference between the pressures in the supply pipe A° and the steam chest A increases, the tendency is to depress the diaphragms and stem R⁴, thus permitting the valve P to seat and thereby raising the pressure in the system L. This rise in pressure transmitted to the chamber R³ tends to return the diaphragms and stem R⁴ to the position in which the valve P is engaged and lifted from its seat by the stem R⁴. In consequence the pressure maintained in the system L, with the apparatus shown in Fig. 2, will rise and fall as the differential between the pressures in the chambers R' and R² increases and diminishes. This differential pressure will increase and diminish for any given position of the governor controlled valve E, as the volume of steam passing into the steam chest increases and diminishes, i. e., as the load on the turbine varies, there being, of course, a definite relation between the load on the turbine and the volume of steam required to carry the load at the speed corresponding to the position of the valve E.

Since the pressure differential due to the throttling action of the valve E decreases with the volume of the steam passing through the steam chest, while the effect of an increase in pressure in the system L is to restrict the flow of steam out of the steam chest, it is apparent that with the mechanism shown the maintenance of the balanced condition of the apparatus requires that the valve E should approach and recede from its seat as the load diminishes and increases. The apparatus shown in Fig. 2 will consequently increase and decrease the turbine speed as the load falls and rises between the no load and full load limits. This is desirable under certain conditions of operation, particularly where turbine driven electric generators are operated in parallel. The extent to which this speed variation is brought about in Fig. 2 is obviously affected by the ratio between the size of the flexible diaphragms $r'$ and $r^2$ and the size of the larger flexible diaphragm $r'$, and any particular regulating device may be quickly changed by replacing its diaphragms $r'$ and $r^2$ by smaller or larger diaphragms.

In the modification illustrated in Fig. 5 the valve casing M of Fig. 1 is replaced by a valve casing MA fitted with a chamber M² to which the piping of the variable pressure system L is connected. An outlet port M' opening from the chamber M² is controlled by a ball valve P and governor actuated throttle valve stem EB in the same manner as the port M' of the apparatus shown in Fig. 1 is controlled. The casing MA is also formed with a chamber M⁴ connected to the chamber M² by a port M³ terminating at its lower end in a conical seat. This port is controlled by a conical valve PA constantly urged toward the position in which it closes the port M³ by a spring P¹¹. The stem P¹⁰ of the valve PA passes through the lower wall of the chamber M⁴, and is provided at its lower end with a collar P¹². The collar P¹² is adapted to be engaged, and the valve PA thereby moved into its open position on a predetermined decrease in the turbine speed by the arm E² of the valve stem EB. The chamber M⁴ is directly connected to the series of compressed air end by the pipe N'. In the operation of this form of my invention, on a rise in the turbine speed, the governor will depress the valve stem EB. This will permit the valve P to entirely close the outlet port M', and will depress the valve PA. Pressure fluid then passes from the source N through the pipe N', chamber M⁴ and port M³ into the chamber M² of the valve casing MA, thus raising the pressure in variable supply stem L and correspondingly adjusting the nozzle valves H', H² and H³. On a decrease in the speed of the turbine, the consequent elevation of the valve stem EB lifts the valve P from its seat and permits the valve PA to move into position in which it closes the port N³. This brings about a reduction of the pressure in the variable pressure system, and a corresponding adjustment of the nozzle valves H', H² and H³. With this form of my invention it is possible to build up the pressure in the variable pressure system more rapidly than this can be readily done with the arrangement shown in Fig. 1, where the supply of pressure fluid to the system L must all pass through the restricted port O. It will be apparent also that a restricted leakage by the valve PA when in its closed position need not be objectionable. On the contrary, the restricted leakage of the pressure fluid past this valve will tend to build up the pressure in the variable system L slowly, just as does the flow through the restricted port O, shown in Fig. 1. With such a constant leakage of pressure fluid into the variable pressure system L, the apparatus may be adjusted so that it will operate exactly the same as that shown in Fig. 1, except upon substantial reductions in the turbine speed. When such reduction in speed occurs the opening of the otherwise closed valve PA permits a more rapid influx of the pressure fluid into the variable pressure system and in consequence the nozzle valves will be adjusted, and the turbine can be brought up to speed more rapidly than would be possible if the valve PA were not then opened. Instead of relying upon leakage past the valve PA to obtain this mode of operation, I may proceed as shown in Fig. 6. The modification shown in Fig. 6 differs from the apparatus shown in Fig. 5, in the addition of a pipe connection N² containing a restricted port O, and extending between the pressure supply tank N and the valve casing M². Under some conditions it may be desirable to have the nozzle valves urged toward their seats by springs, and to employ the pressure of the variable pressure system to bring about the opening movements of the valves. Due arrangement for accomplishing this is shown in Fig. 7, wherein the pistons I of the nozzle valves HA', HA² and HA³ work in cylinders JC', JC² and JC³, respectively, which are connected at their lower ends to the variable pressure system L. The springs K', K² and K³ of graduated strength act between the upper ends of the pistons I and spring followers J²⁰ adjustably threaded in the outer ends of the cylinders JC′, JC² and JC³. With this arrangement the pressure in the variable system L should decrease as the engine speed increases. This result is obtained by connecting an operating rod M¹¹ for the valve P to the lever F so that this rod will rise as the engine speed decreases and fall as the engine speed increases. As shown, rod M¹¹ is guided at its upper end in a guide M¹⁰ carried by the valve casing M and is connected at its lower end to one end of a lever M¹² which has its other end connected to the lever F. The lever M¹² is fulcrumed at M¹³. With the arrangement shown in Fig. 7, an accidental reduction of the pressure in the system L will result in the closure of the nozzle valves HA′, HA² and HA³. As shown in Fig. 7, the nozzle valves are balanced valves and it will be understood, of course, that the nozzle valves in all of the forms shown may be balanced valves similar to those shown in Fig. 7.

While in accordance with the provisions of the statutes I have herein described and illustrated the best form of my invention now known to me, it will be apparent to those skilled in the art that changes may be made in the form of the apparatus disclosed without departing from the spirit of my invention.

Having now described my invention, what I claim as new and desire to secure by Letters Patent, is:

1. In combination, a fluid pressure motor having a plurality of motive fluid inlets, a separate valve controlling each inlet, fluid pressure operating means for said valves adapted to open and close said valves successively as the pressure of a pressure fluid supplied to said operating means varies in one direction or the other, and including a variable pressure system having a pressure inlet port and an exhaust port, a valve controlling one of said ports, the other of said ports being more restricted than the valve controlled port when the controlling valve for the latter is in the wide open position, and means responsive to the speed of the motor for adjusting said valve to progressively vary the pressure of such pressure fluid in one direction or the other on a corresponding variation in the speed of the motor by an amount progressively increasing during the period in which such variation continues.

2. In combination, a fluid pressure motor having a plurality of motive fluid inlets, a separate valve controlling each inlet, and operating means for giving said valves separate opening and closing movements including a variable pressure system, means for subjecting each valve to a force proportional to the pressure in said system and tending to give the valve its movement in one direction, means for subjecting each valve to an opposing force which becomes equal to the first mentioned force acting on the valve when the pressure in said system reaches a predetermined value which is different from the values at which the opposing forces become equal in the case of the other valves whereby said valves open or close successively as the pressure in said system is varied in one direction or the other, a source of pressure fluid, a port connecting said source to said system and a second port through which the pressure fluid may exhaust from said system, a valve regulating the flow through one of said ports, the other of said ports being more restricted than the valve controlled port when the controlling valve for the latter is in the wide open position, and a speed governor for adjusting said valve as the speed of the motor varies, said system being of such capacity and said ports and said valve being so proportioned and arranged that the pressure in said system will depend upon the duration as well as the extent of small variations from the normal of the speed of the motor.

3. In combination, a fluid pressure motor having a plurality of motive fluid inlets, a separate valve controlling each inlet, a throttle valve controlling the supply of motive fluid to said inlets, fluid pressure operating means for said inlet controlling valves adapted to open or close said valves successively as the pressure of a pressure fluid supplied to said operating means varies in one direction or the other, means responsive to the speed of the motor for adjusting said throttle valve, and means governed by said last mentioned means for varying the pressure in said system on a variation in the speed of the motor.

4. In combination, a fluid pressure motor having a plurality of motive fluid inlets, a separate valve controlling each inlet, a throttle valve controlling the supply of motive fluid to said inlets, fluid pressure operating means for said inlet controlling valves adapted to open or close said valves successively as the pressure fluid supplied to said operating means varies in one direction or the other, means responsive to the speed of the motor for adjusting said throttle valve, and means governed by said last mentioned means for varying the pressure in said system on a speed variation of the motor, less than that required to effect a substantial adjustment of the throttle valve, and by an amount which increases with the duration of said variation.

5. In combination, a fluid pressure motor having a plurality of motive fluid inlets, a separate valve controlling each inlet, fluid pressure operating means for said valve adapted to open and close said valves successively as the pressure of the pressure fluid supplied to said operating means varies in one direction or the other, and means for maintaining a regulated pressure in said system comprising a source of pressure fluid, a port connecting said source to said system and a second port through which the pressure fluid may exhaust from said system, one of said ports being restricted, a valve controlling the other port, and means responsive to the speed of the motor for adjusting said valve.

6. In combination, a fluid pressure motor having a plurality of motive fluid inlets, a separate valve controlling each inlet, fluid pressure operating means for said valves adapted to open and close said valves successively as the pressure of pressure fluid supplied to said operating means varies in one direction or the other including a variable pressure system having a pressure inlet port and an exhaust port, a valve controlling one of said ports, the other of said ports being more restricted than the valve controlled port when the controlling valve for the latter is in the wide open position, and means responsive to the load on the motor for adjusting said valve to progressively vary the pressure of said pressure fluid in one direction or the other on a corresponding variation in the load of the motor by an amount progressively increasing during the period in which such variation continues.

GEORGE H. GIBSON.

Witnesses:
PAUL A. BAUCEL,
STANLEY D. BROWN.